United States Patent [19]

Ellion

[11] 4,324,096
[45] Apr. 13, 1982

[54] HYDRAZINE THRUSTER

[75] Inventor: M. Edmund Ellion, Arcadia, Calif.

[73] Assignee: Hughes Aircraft Company

[21] Appl. No.: 32,074

[22] Filed: Apr. 23, 1979

[51] Int. Cl.³ .......................... F02K 1/40; F02K 7/02
[52] U.S. Cl. ............................ 60/200 R; 60/39.46 M;
 60/218
[58] Field of Search .............. 60/200 R, 39.46 M, 218

[56] References Cited

U.S. PATENT DOCUMENTS

| 3,695,041 | 10/1972 | Eggers et al. | 60/39.46 M |
|---|---|---|---|
| 3,719,046 | 3/1973 | Sutherland et al. | 60/39.46 M |
| 3,871,828 | 3/1975 | Ellion et al. | 60/200 R |
| 4,027,476 | 6/1977 | Schmidt | 60/34.46 M |
| 4,069,664 | 1/1978 | Ellion et al. | 60/39.46 M |
| 4,162,292 | 7/1979 | Speeds | 60/34.46 M |

FOREIGN PATENT DOCUMENTS

| 1167948 | 10/1969 | United Kingdom . |
|---|---|---|
| 1194978 | 6/1970 | United Kingdom . |
| 1346848 | 2/1974 | United Kingdom . |
| 1405847 | 9/1975 | United Kingdom . |
| 1439754 | 6/1976 | United Kingdom . |
| 1534601 | 12/1978 | United Kingdom . |

OTHER PUBLICATIONS

TRW Report 20266-6009, "Monopropellant Hydrazine Resistojet", TRW System, Redondo Beach, Calif., Feb. 1972, pp. 8-11, 18-28.

Primary Examiner—Robert E. Garrett
Attorney, Agent, or Firm—Allen A. Dicke, Jr.; W. H. MacAllister

[57] ABSTRACT

Hydrazine thruster 30 minimizes impulse bit degradation by making the hydrazine more reactive with the catalyst 66 by using higher temperature hydrazine and smaller catalyst grain, and also concentrates the injected hydrazine in smaller catalyst volume 66 so that heat released aids decomposition of a greater quantity of injected hydrazine.

10 Claims, 6 Drawing Figures

HYDRAZINE THRUSTER

BACKGROUND OF THE INVENTION

This invention is directed to a hydrazine thruster wherein the hydrazine is injected into a catalyst bed and is dissociated whereby hot gas is ejected from a nozzle to produce thrust.

Previous hydrazine dissociation thrusters have experienced problems when operated in a repetitive single pulse mode. For single pulses with long off times between pulses, a prior art thruster will perform normally for a few pulses, but will then perform very much below design levels. After extensive investigation, it was determined that if the catalyst bed is maintained at temperatures exceeding 400° F., all pulses are normal at all on/off time combinations tested. This solution to the pulse degradation problem is undesirable because of the power required for the heater. This solution is also undesirable because the heater is located on the catalyst bed wall and its temperature approaches 2,000° F. during thruster operation. Heaters operating in such an environment are difficult to design and are susceptible to failure. It was discovered during tests using extremely pure hydrazine that such hydrazine limited or, in some cases, overcame the pulse mode degradation problem. Based on this discovery, it was postulated that the small amount of aniline in normal military grade hydrazine deposits on the hydrazine dissociation catalyst at temperatures below 300° F. It was postulated that this deposit poisons the catalyst and prevents it from effectively decomposing the hydrazine. While this postulation was not widely accepted, no previous researcher had been able to prevent thrust degradation for long off-time duty cycles.

SUMMARY OF THE INVENTION

In order to aid in the understanding of this invention it can be stated in essentially summary form that it is directed to a hydrazine thruster wherein the hydrazine is made more reactive with the catalyst either by preheating the hydrazine or by using a smaller catalyst grain size or by concentrating the injected hydrazine into a smaller region thereby causing heat release to aid decomposition of a greater quantity of the injected hydrazine. By these means degradation of the impulse bit in pulse mode operation is minimized.

It is thus an object of this invention to provide a hydrazine thruster wherein impulse bit degradation in pulse mode operation is minimized, and preferably does not occur in the desired operating modes. It is another object of this invention to provide a hydrazine thruster wherein the hydrazine is more reactive with the catalyst in the hydrazine dissociation catalyst bed. It is a further object of this invention to preheat incoming hydrazine to increase hydrazine reactivity. It is another object to use a smaller catalyst grain size to make the hydrazine more reactive with the hydrazine dissociation catalyst to maximize hydrazine dissociation. It is another object to concentrate the injected hydrazine into a smaller volume of the catalyst so that the heat released by dissociation aids in decomposition of a greater proportion of the injected hydrazine.

Other objects and advantages of this invention will become apparent from the study of the following portion of this specification, the claims and the attached drawings.

DESCRIPTION OF THE PREFERRED EMBODIMENT

Figure 5:
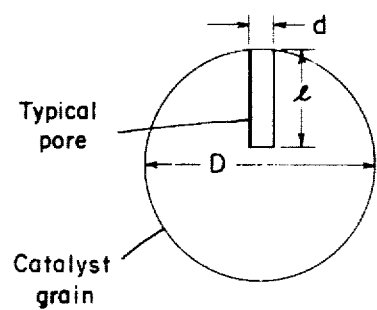
FIG. 5 is an enlarged section through a typical catalyst grain.

This invention is directed to the discovery of the cause of the degradation of impulse bits in pulse mode operation of a hydrazine thruster and to the resultant design features which permit pulse mode operation in the desired time ranges without impulse bit degradation. Pulse mode operation is when a thruster is operated for a short on-pulse followed by a long pause before the next short pulse. Under these circumstances, only approximately 50% of the hydrazine injected for the first pulse will react with the catalyst if both the catalyst and hydrazine are initially below 70° F. The remaining 50% of the hydrazine is drawn by surface tension into the very porous catalyst grains. (See FIG. 5). If the thruster is exposed to the vacuum of space or of a test chamber, the remaining unreacted hydrazine will vaporize. When the first pulse is short so that the catalyst temperature has not been substantially increased by the heat of decomposition of the hydrazine, then the vaporization of the remaining hydrazine over a period of time causes the catalyst temperature to drop below the initial 70° F. value. If the hydrazine for the second pulse is injected at this time, with the cooler catalyst bed, less than 50% of the hydrazine is decomposed since the catalyst is less reactive because it is at a lower temperature. As a result, a lower impulse is realized for the second pulse. After a certain time, further vaporization of the even larger quantity of remaining unreacted hydrazine lowers the catalyst temperature even further. After each succeeding pulse, the temperature in the catalyst bed gets lower and lower and the impulse bit gets smaller and smaller until the hydrazine can no longer decompose and the thruster no longer produces thrust. This condition exists until the catalyst temperature increases by receiving heat from external heat sources until the catalyst reaches a temperature that can cause reaction. This manner of operation has been illustrated by pulse firing a thruster into a vacuum chamber and observing the degradation of thrust resulting from each pulse, or the decrease in the resultant impulse bit. The same thruster was fired into a chamber at 1 atmosphere pressure and no pulse degradation occurred, since no evaporative cooling occurred.

Figure 4:
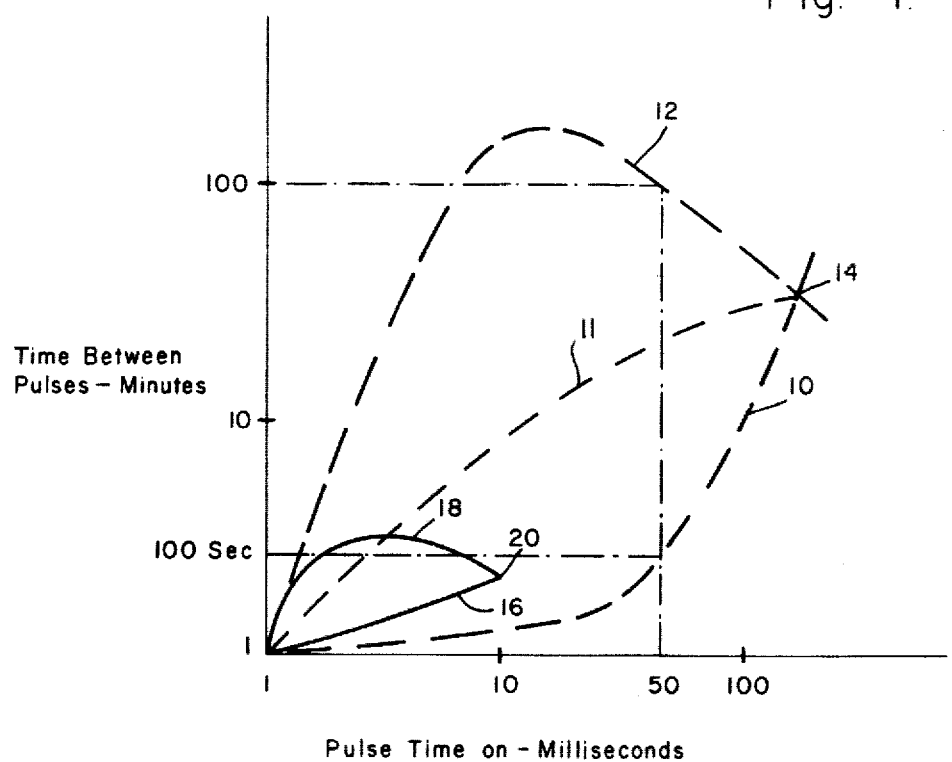
FIG. 4 is a time chart showing the time conditions in which pulse mode degradation can occur.

FIG. 4 shows the time domain in which impulse bit degradation can occur for specific hydrazine thrusters. In the graph of FIG. 4, the abscissa represents the time that the propellant valve is open and the ordinate is the time that the valve is closed between pulses. Curves 10 and 12 represent the lower and upper limits of pulse mode degradation for a prior art thruster, the Hughes Aircraft Company Model HE-021 hydrazine thruster of a nominal value of 0.2 lbs. force thrust. The curve 10 is the time to cool to the initial temperature and represents the fact that the time required to cool the catalyst to a value lower than its temperature just prior to the pulse will have the shape shown since longer on-times result in the higher catalyst temperatures and require longer off-times to return to the prepulse temperature. There is an on-time where so much of the hydrazine is decomposed that there is an insufficient amount of remaining undecomposed liquid hydrazine to vaporize and cool the hot catalyst below the ambient temperature. This on time is defined as the verticle asymtote to the curve 10. The curve 12 illustrates the time required to vaporize all of the hydrazine and then, by drawing heat from the surroundings, to warm the bed to return the catalyst bed to the prepulse temperature. The curve 12 passes through the origin since for zero-on-time it must take zero off-time to vaporize all of the hydrazine. Furthermore, for very long pulses, the time to remove all of the hydrazine is just the pulse on-time. Between these two extremes, the curve 12 reaches a maximum because at that point there is the most unreacted hydrazine within the pores of the catalyst grain and this results in the longest off-time to evaporate all of the remaining hydrazine. Beyond the intersection point 14 of the curves 10 and 12, the thruster will not experience pulse mode degradation since all of the hydrazine is vaporized before the catalyst temperature decreases to the prepulse temperature. Between curves 10 and 12 curve 11 represents the time to vaporize all of the hydrazine and to cool to reach the minimum temperature. The area below curve 10 is where the catalyst is hotter than the initial temperature. The area above curve 12 represents catalyst at or above initial temperature.

The area between the curves 10 and 12 is the area in which pulse mode degradation can occur. In a specific example, for this particular thruster and a particular inlet pressure of 100 psi, an on-time of 0.050 second will require 100 seconds for the catalyst to cool to the prepulse temperature and it will remain below the prepulse temperature for 100 minutes. Thus, if the next pulse is fired between 100 seconds and 100 minutes, the impulse will decrease. The catalyst is very porous. It is Shell 405 ABSG catalyst and has about one square yard of area for a 0.030" diameter grain. The time required to cool to initial temperature (curve 10 of FIG. 4):

$$T_{cool} = f_1(W, d/D, l, t)$$

Figure 6:
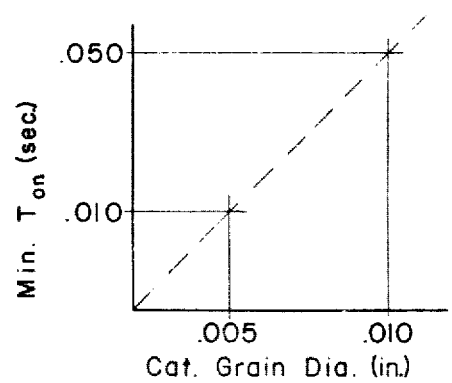
FIG. 6 is a graph showing minimum on pulse time vs. catalyst grain diameter.

The time required to warm back to initial temperature $t_i$ (curve 12 of FIG. 4):

$$T_{warm} = f_2(W, D, l/d, I, t)$$

where:
W = weight of hydrazine injected
D = diameter of catalyst grain
l = length (depth) of typical pore
d = diameter of typical pore
I = injector factor related to how hydrazine is concentrated.
t = temperature of injected hydrazine This invention provides features so that the thruster in accordance with this invention has a reduced zone of pulse-time versus off-time wherein the impulse bit degrades. A pair of curves 16 and 18 represent the lower and upper limits which define the envelope in which pulse mode operation causes impulse bit degradation for the improved thruster. As is seen in FIG. 4, the envelope is much smaller. More important, however, is the fact that an intersection point 20 of the curves 16 and 18 is lower than the minimum value desired for on time operation. Thus, the thruster will not be operated on pulses shorter than 10 milliseconds, so that in the entire desired operating regime, no impulse bit degradation occurs. This minimum operating pulse has been confirmed in qualification tests of Hughes Aircraft Company thruster model HE021A. Test data indicate the sensitivity of catalyst grain diameter to minimum allowable on times. The data indicate the trends illustrated in FIG. 6. One other experimentally determined fact for this particular thruster design is that an impulse bit [(thrust × time)] of 0.0045 #-sec is the minimum allowable to prevent pulse mode degradation. FIG. 4 is true of a given inlet pressure (100 psia) and for this particular thruster. However, the impulse-bit criteria is independent of inlet pressure. Thus for an on-time of 0.010 sec and an inlet pressure of 300 psia, we would get a greater impulse-bit than we did at 100 psia inlet. As a result, the on-time at the higher inlet pressure could be reduced to about 0.005 sec and still result in the 0.0045 H-sec impulse bit and no pulse mode degradation.

Figure 1:
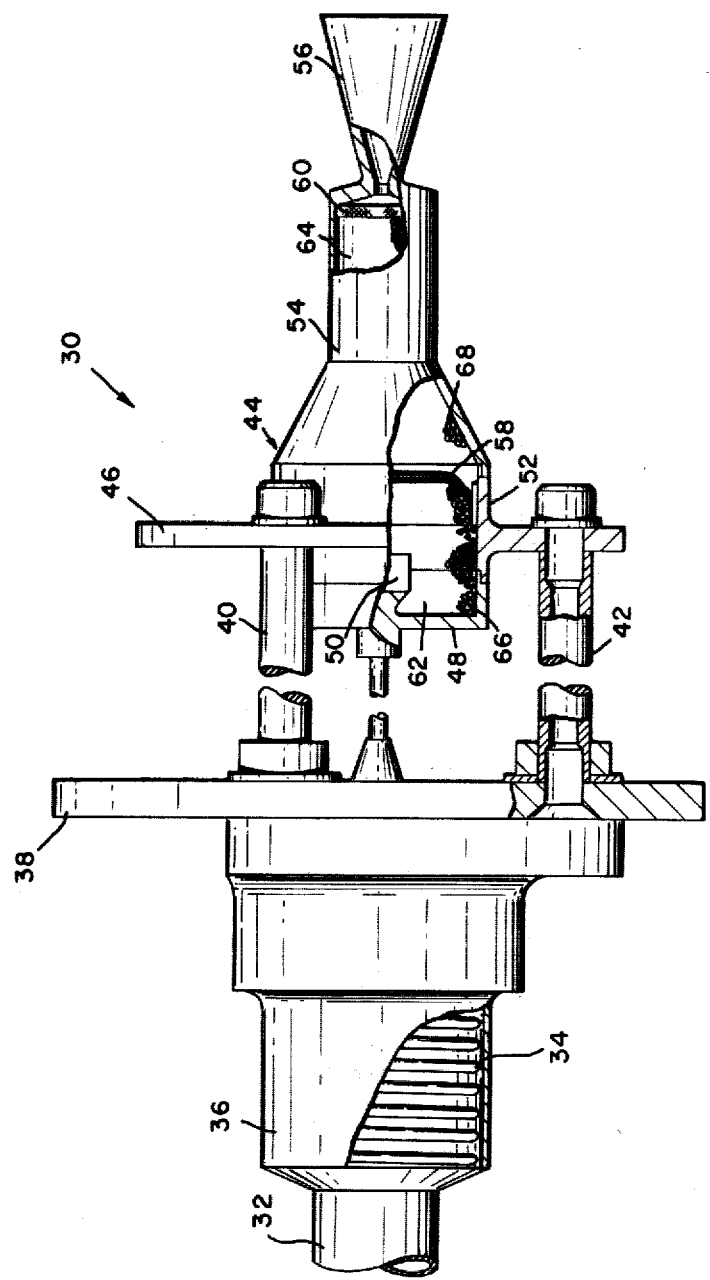
FIG. 1 is a side elevational view of the hydrazine thruster of this invention, with parts broken away and parts taken in section.

A hydrazine thruster in accordance with this invention is generally indicated at 30 in FIG. 1. Liquid hydrazine is furnished to the thruster from a suitable pressurized source through a supply line 32. A valve 36 is in the supply line and is electrically controlled to permit flow of liquid hydrazine to the injector in the thruster. A mounting flange 38 is for attachment to the spacecraft structure, and the entire hydrazine thruster 30 is supported therefrom. A heater 34 is provided either on the valve 36 or on the mounting flange 38 to heat the valve and cause the incoming hydrazine minimum temperature to be above 80° F. The heater 34 is electrically controlled and powered. A set of three low thermal conductivity posts, two of which are indicated at 40 and 42, support a thrust chamber 44 by a flange 46. This supporting structure limits the amount of heat delivered from the thrust chamber to the spacecraft structure.

The thrust chamber 44 is made up of a backplate 48 which carries a hydrazine injector 50, a ring 52 which carries a flange 46, a chamber housing 54 and a nozzle 56. These thrust chamber parts and nozzle are secured together with a separator screen 58 and a bed support 60 to define an upstream catalyst chamber 62 and a downstream catalyst chamber 64. These chambers respectively contain a catalyst 66 and a catalyst 68. The separator screen 58 divides the thrust chamber into the upper and lower catalyst chambers and consists of a double layer of domeshape screen. Each screen consists of a woven platinum-iridium wire screen brazed into a groove machined in the chamber wall. A lower bed support 60 comprises a circular disc with several holes therethrough and a nichrome V screen welded to the upstream side of the plate. The nozzle 56 is a straight conical nozzle having a 15° half angle and an expansion ratio of 100:1. Both the catalyst 66 and the catalyst 68 are Shell 405 ABSG fine catalyst granules. They are screened to achieve uniform dimensions and the catalyst in both beds has a diameter of about 0.010 inch. (The prior structures use catalyst granules having a diameter of 0.020 inches or larger.)

The diameter of the upstream catalyst chamber 62 is larger than the diameter of the downstream catalyst chamber 64. The reason is to allow a greater area for the deposition of non-volatile residue that is contained in the standard military grade hydrazine. The larger cross-sectional area of the upstream bed allows a greater amount of hydrazine to flow through the thruster before the build-up of non-volatile residue deposits become sufficient to restrict catalytic action or flow blockage to result in lower thrust. The downstream bed is made smaller to minimize the chamber volume to result in rapid response. The non-volatile residues are deposited in the upstream bed and thus do not poison or block the downstream catalyst bed in the chamber 64.

Figure 2:
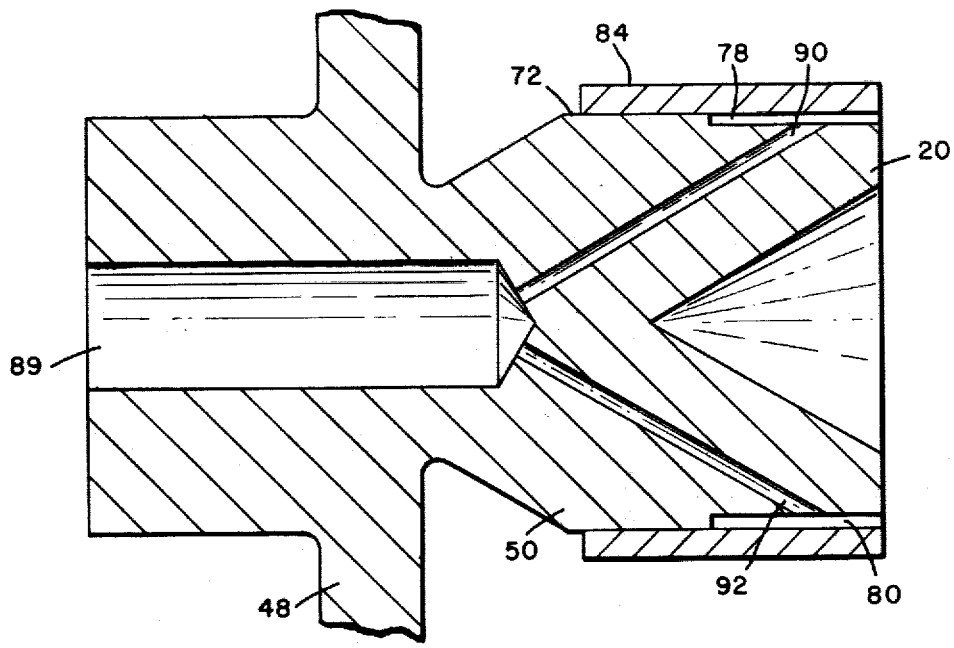
FIG. 2 is an enlarged longitudinal section through the injector of the hydrazine thruster of this invention.
Figure 3:
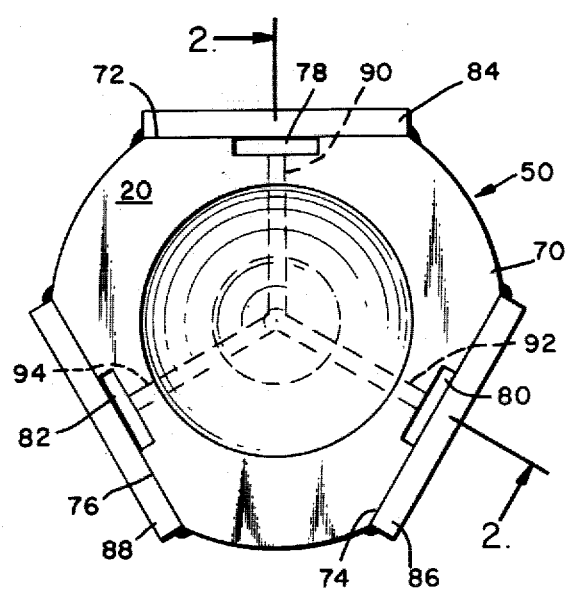
FIG. 3 is a front view of the injector on the same scale as FIG. 2.

Another improvement which minimizes impulse bit degradation is the particular design of the hydrazine injector 50. As seen in FIGS. 2 and 3, the hydrazine injector 50 has a nozzle body 70 on which is machined a set of three flats 72, 74 and 76. Each of the flats has a groove therebelow. A set of grooves 78, 80 and 82 is respectively illustrated. A set of cover plates 84, 86 and 88 is secured over the grooves so that each of the grooves forms an injector passage. The injector passages are supplied with hydrazine under pressure through a bore 89 and a set of distribution openings 90, 92 and 94 respectively. It should be noted that the nozzle openings are parallel to each other and are directed parallel to the thrust axis which is the center line through the center of the injector 50, the thrust chamber and the nozzle 56. Furthermore, the interior volume of the injector is minimized. With the individual injector nozzle channels being directed parallel to each other, the injected hydrazine is concentrated into a more local volume of the catalyst so that local volume can heat up to a higher temperature for a short impulse bit and result in a greater amount of hydrazine decomposition to result in a higher localized temperature. By means of these design characteristics, plus the maintaining of valve 36 between 80° F. and 185° F., the time regime in which pulse mode degradation occurs is limited to the graph area in FIG. 4 to the left of point 20 and between curves 16 and 18. Thus, no impulse bit degradation occurs in pulse mode operation when the thruster 30 is operated in its desired mode, that is with minimum pulse time above 10 milliseconds. The disclosed thruster has been tested and has demonstrated a capability to deliver continued high-quality performance, with close tolerance thrust predictability and with a consistent chamber pressure, and provide for long life, using mil-spec. hydrazine.

This invention having been described in its preferred embodiment, it is clear that it is susceptible to numerous modifications within the ability of those skilled in the art and without the exercise of the inventive faculty. Accordingly, the scope of this invention is defined by the scope of the following claims.

What is claimed is:

1. A hydrazine thruster for pulse mode operation comprising:
   thrust chamber means for containing a hydrazine dissociation catalyst and having a centerline;
   hydrazine injector means for injecting liquid hydrazine into said thrust chamber means substantially only along said centerline and directly into said catalyst in a plurality of successive pulses, said injector means and said thrust chamber means for containing a hydrazine dissociation catalyst being arranged so that during repetitive pulsing insufficient residual hydrazine is stored in the catalyst bed so that hydrazine bed temperature does not decrease from the temperature at the initiation of one pulse to the temperature at the initiation of the next pulse;
   means for supplying pulses of liquid hydrazine to said hydrazine injector means; and
   an outlet from said thrust chamber from which hot gases exit said thrust chamber to produce thrust, there being sufficient hydrazine injected into said thrust chamber means by said hydrazine injector means so that for each pulse the impulse bit, which is the summation of the product of thrust times time, is at least 0.0045 pound seconds.

2. A hydrazine thruster for use in pulse mode operation comprising:
   a thrust chamber for containing a hydrazine dissociation catalyst, said thrust chamber having a centerline;
   means for supplying pulses of liquid hydrazine of sufficient size to produce at least a minimum impulse bit;
   a hydrazine injector connected to said means for supplying pulses of liquid hydrazine to receive the pulses of liquid hydrazine and for injecting the pulses of of liquid hydrazine into said thrust chamber so that the liquid hydrazine dissociates and produces heat, said hydrazine injector being positioned to inject liquid hydrazine substantially only along the centerline of said thrust chamber and directly into said catalyst; and
   a nozzle on said thrust chamber serving as exit for hot gases from said thrust chamber so that pulses are produced, and hydrazine in said catalyst chamber supplied from said supply means and through said nozzle in sufficient quantity to provide an impulse bit which is the summation of the product of thrust times time of at least 0.0045 pound seconds.

3. A hydrazine thruster for use in pulse mode operation comprising:
   a thrust chamber for containing a hydrazine dissociation catalyst, said thrust chamber having a center line;
   a hydrazine injector for injecting pulses of hydrazine into said thrust chamber so that liquid hydrazine dissociates and produces heat, said hydrazine injector having a body, at least three flats formed on the exterior of said body, said flats lying substantially parallel to said center line, a groove formed in each of said flats, each of said grooves being directed parallel to said center line, a cover plate secured to each of said flats to enclose said grooves so that said grooves form a plurality of outlets, each of said outlets being positioned substantially parallel to and spaced from said center line; and
   means for supplying liquid hydrazine to said grooves so that injected hydrazine is injected in a plurality of streams substantially parallel to said center line and is concentrated along the center line of said thrust chamber.

4. A hydrazine thruster for use in pulse mode operation comprising:
   a thrust chamber for containing a hydrazine dissociation catalyst, said thrust chamber having a centerline, said thrust chamber being divided into an upstream catalyst chamber and a downstream catalyst chamber, said chambers being separated by a separator screen;
   a hydrazine injector for injecting pulses of hydrazine into said thrust chamber so that liquid hydrazine dissociates and produces heat, said hydrazine injector having a body, at least three flats formed on the exterior of said body, said flats lying substantially parallel to said centerline, a groove formed in each of said flats, each of said grooves being directed parallel to said centerline, a cover plate secured to each of said flats to enclose said grooves so that said grooves form a plurality of outlets, each of said outlets being positioned substantially parallel to and spaced from said centerline;

and means for supplying liquid hydrazine to said grooves so that injected hydrazine is injected in a plurality of streams substantially parallel to said centerline and is concentrated along the centerline of said thrust chamber.

5. A hydrazine thruster for use in pulse mode operation comprising:

a thrust chamber for containing a hydrazine dissociation catalyst, said thrust chamber having a centerline, said thrust chamber being divided into an upstream catalyst chamber and a downstream catalyst chamber, said chambers being separated by a separator screen, at least said upstream thrust chamber containing hydrazine dissociation catalyst having granules less than 0.020 inches in diameter;

a hydrazine injector for injecting pulses of hydrazine into said thrust chamber so that liquid hydrazine dissociates and produces heat, said hydrazine injector having a body, at least three flats formed on the exterior of said body, said flats lying substantially parallel to said centerline, a groove formed in each of said flats, each of said grooves being directed parallel to said centerline, a cover plate secured to each of said flats to enclose said grooves so that said grooves form a plurality of outlets, each of said outlets being positioned substantially parallel to and spaced from said centerline;

means for supplying liquid hydrazine to said grooves so that injected hydrazine is injected in a plurality of streams substantially parallel to said centerline and is concentrated along the centerline of said thrust chamber.

6. A hydrazine thruster for use in pulse mode operation comprising:

a thrust chamber for containing a hydrazine dissociation catalyst, said thrust chamber having a center line, said thrust chamber being divided into an upstream catalyst chamber and a downstream catalyst chamber, said upstream catalyst chamber being larger in cross-section than said downstream catalyst chamber, said chambers being separated by a separator screen;

a hydrazine injector for injecting pulses of hydrazine into said thrust chamber so that liquid hydrazine dissociates and produces heat, said hydrazine injector being positioned to inject liquid hydrazine substantially along the center line of said thrust chamber; and a nozzle on said thrust chamber serving as exit for hot gases from said thrust chamber so that thrust pulses are produced.

7. A hydrazine thruster for use in pulse mode operation comprising:

a thrust chamber, said thrust chamber being divided into an upstream catalyst chamber and a downstream catalyst chamber, said catalyst chambers being separated by a screen, said upstream catalyst chamber being larger in cross-section than said downstream catalyst chamber, hydrazine dissociation catalyst having granules less than 0.020 inches in diameter in both of said catalyst chambers;

a hydrazine injector for injecting pulses of liquid hydrazine into said thrust chamber so that liquid hydrazine dissociates and produces heat, said hydrazine injector being positioned to inject liquid hydrazine substantially along the center line of said thrust chamber;

and a nozzle on said thrust chamber serving as exit for hot gases from said thrust chamber so that pulses are produced.

8. A hydrazine thruster for use in pulse mode operation comprising:

a thrust chamber for containing a hydrazine dissociation catalyst, said thrust chamber having a center line, said thrust chamber being divided into an upstream catalyst chamber and a downstream catalyst chamber, said chambers being separated by a separator screen, positioned so that said center line through thruster extends from said injector through said nozzle and said upstream catalyst chamber has a larger cross-sectional area perpendicular to said center line than said downstream catalyst chamber so that said upstream catalyst chamber can receive and hold hydrazine contaminants and maintain dissociated hydrazine flow area therearound;

a hydrazine injector for injecting pulses of hydrazine into said thrust chamber so that liquid hydrazine dissociates and produces heat, said hydrazine injector being positioned to inject liquid hydrazine substantially along the center line of said thrust chamber;

a nozzle on said thrust chamber serving as exit for hot gases from said thrust chamber so that thrust pulses are produced.

9. A hydrazine thruster for use in pulse mode operation comprising:

a thrust chamber for containing a hydrazine dissociation catalyst, said thrust chamber having a center line, said thrust chamber being separated into an upstream catalyst chamber and a downstream catalyst chamber, said chambers being separated by a separator screen, said upstream catalyst chamber having a larger cross-sectional area perpendicular to said center line than said downstream catalyst chamber so that said upstream catalyst chamber can receive and hold hydrazine contaminants and maintain dissociated hydrazine flow area therearound, hydrazine dissociation catalyst in each of said thrust chambers, the granule size of said catalyst at least in said upstream thrust chamber being less than 0.020 inches in diameter;

a hydrazine injector for injecting pulses of liquid hydrazine into said thrust chamber so that liquid hydrazine dissociates and produces heat, said hydrazine injector being positioned to inject liquid hydrazine substantially along the center line of said thrust chamber;

and a nozzle in said thrust chamber serving as exit for hot gases from said thrust chamber so that thrust pulses are produced.

10. A hydrazine thruster for use in pulse mode operation comprising:

a thrust chamber for containing a hydrazine dissociation catalyst, said thrust chamber having a centerline, said thrust chamber being divided into an upstream catalyst chamber and a downstream catalyst chamber, said chambers being separated by a separator screen, said upstream catalyst chamber having a larger cross-sectional area perpendicular to said centerline than said downstream catalyst chamber so that said upstream catalyst chamber can receive and hold hydrazine contaminants and maintain the flow of dissociated hydrazine products therearound, hydrazine dissociation catalyst in each of said thrust chambers, the granule size of said catalyst at least in said upstream thrust chamber being less than 0.020 inches in diameter;

means for supplying pulses of liquid hydrazine of sufficient size to produce at least a minimum impulse bit;

a hydrazine injector connected to said means for supplying pulses of liquid hydrazine to receive the pulses of liquid hydrazine and for injecting pulses of hydrazine into said thrust chamber so that liquid hydrazine dissociates and produces heat, said hydrazine injector being positioned to inject liquid hydrazine substantially along the centerline of said thrust chamber, and hydrazine in said catalyst chamber in sufficient quantity to provide an impulse bit which is the summation of the product of thrust times time of at least 0.0045 pound seconds; and a nozzle on said thrust chamber serving as exit for hot gases from said thrust chamber so that thrust pulses are produced.

* * * * *